United States Patent
Shimozawa et al.

(10) Patent No.: US 11,493,853 B2
(45) Date of Patent: Nov. 8, 2022

(54) ELECTROPHOTOGRAPHIC PHOTOSENSITIVE MEMBER, PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Hideharu Shimozawa, Shizuoka (JP); Kenichi Kaku, Shizuoka (JP); Tsutomu Nishida, Shizuoka (JP); Kazunori Noguchi, Shizuoka (JP); Akihiro Maruyama, Shizuoka (JP); Kaname Watariguchi, Kanagawa (JP); Takashi Anezaki, Kanagawa (JP); Haruyuki Tsuji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/149,568

(22) Filed: Jan. 14, 2021

(65) Prior Publication Data
US 2021/0240093 A1    Aug. 5, 2021

(30) Foreign Application Priority Data
Jan. 30, 2020  (JP) .............................. JP2020-014150

(51) Int. Cl.
G03G 5/147  (2006.01)
C08G 83/00  (2006.01)
G03G 21/18  (2006.01)

(52) U.S. Cl.
CPC ....... *G03G 5/14786* (2013.01); *C08G 83/007* (2013.01); *G03G 21/1814* (2013.01)

(58) Field of Classification Search
CPC . G03G 5/147; G03G 5/14713; G03G 5/14791
See application file for complete search history.

(56) References Cited

U.S. PATENT DOCUMENTS

2013/0252154 A1* 9/2013 Saito .................. G03G 21/18
430/58.05

FOREIGN PATENT DOCUMENTS

| JP | 2011248288 A | 12/2011 | |
| JP | 2012-181244 | * 9/2012 | ............ G03G 5/147 |
| JP | 2012181244 A | 9/2012 | |

OTHER PUBLICATIONS

Translation of JP 2012-181244.*

* cited by examiner

*Primary Examiner* — Peter L Vajda
(74) *Attorney, Agent, or Firm* — Canon U.S.A., Inc., IP Division (57) ABSTRACT

An electrophotographic photosensitive member having a support and a photosensitive layer on the support, wherein the electrophotographic photosensitive member comprises a surface layer comprising a polymerization product of a composition containing polyrotaxane and a charge transporting substance, and the polymerization product including a bond between the polyrotaxane and the charge transporting substance.

5 Claims, 2 Drawing Sheets

ELECTROPHOTOGRAPHIC PHOTOSENSITIVE MEMBER, PROCESS CARTRIDGE AND ELECTROPHOTOGRAPHIC IMAGE FORMING APPARATUS

BACKGROUND

Field

The present disclosure relates to an electrophotographic photosensitive member, a process cartridge having the electrophotographic photosensitive member, and an electrophotographic image forming apparatus having the electrophotographic photosensitive member.

Description of the Related Art

As an electrophotographic photosensitive member, which is to be loaded in a process cartridge and an electrophotographic image forming apparatus (hereinafter referred to as an "electrophotographic apparatus"), an electrophotographic photosensitive member containing an organic photoconductive substance (charge generating substance) is used. In recent years, an electrophotographic apparatus having a longer life has been demanded, and it is desired to provide an electrophotographic photosensitive member capable of improving image quality and abrasion resistance (mechanical durability) and suppressing potential fluctuation.

The electrophotographic photosensitive member loaded in the electrophotographic apparatus has been extensively studied in order to improve the image quality and abrasion resistance. As an example, there is a study to improve the abrasion resistance by incorporating a self-healing resin in a surface layer of an electrophotographic photosensitive member.

Japanese Patent Applications Laid-Open Nos. 2012-181244 and 2011-248288 describe techniques relating to an electrophotographic photosensitive member in which a photosensitive layer or a surface layer of the electrophotographic photosensitive member contains polyrotaxane.

According to the studies by the present inventors, it has been found that the electrophotographic photosensitive members described in Japanese Patent Applications Laid-Open Nos. 2012-181244 and 2011-248288 may have insufficient sensitivity. It has also been found that the abrasion resistance may be insufficient in repeated use in a low temperature and low humidity environment.

SUMMARY

Therefore, an aspect of the present disclosure is to provide an electrophotographic photosensitive member having high sensitivity and excellent abrasion resistance even in repeated use in a low temperature and low humidity environment.

The above aspect is achieved by the following present disclosure.

That is, an electrophotographic photosensitive member according to the present disclosure is an electrophotographic photosensitive member having a support and a photosensitive layer on the support. In this electrophotographic photosensitive member, the electrophotographic photosensitive member comprises a surface layer comprising a polymerization product of a composition containing polyrotaxane and a charge transporting substance, and the polymerization product includes a bond between the polyrotaxane and the charge transporting substance.

According to another aspect of the present disclosure, there is provided a process cartridge that integrally supports the electrophotographic photosensitive member and at least one unit selected from the group consisting of a charging unit, a developing unit, and a cleaning unit and is detachably attachable to a main body of an electrophotographic image forming apparatus.

Further, according to another aspect of the present disclosure, there is provided an electrophotographic image forming apparatus having the electrophotographic photosensitive member, a charging unit, an exposing unit, a developing unit, and a transfer unit.

Further features of the present disclosure will become apparent from the following description of exemplary embodiments with reference to the attached drawings.

DESCRIPTION OF THE EMBODIMENTS

Hereinafter, the present disclosure will be described in detail with reference to preferred embodiments.

The electrophotographic photosensitive member (hereinafter, also referred to as a "photosensitive member") according to the present disclosure is an electrophotographic photosensitive member having a support and a photosensitive layer on the support. The electrophotographic photosensitive member comprises a surface layer comprising a polymerization product of a composition containing polyrotaxane and a charge transporting substance. The polymerization product includes a bond between the polyrotaxane and the charge transporting substance.

As a technique for improving the abrasion resistance of the photosensitive member, Japanese Patent Applications Laid-Open Nos. 2012-181244 and 2011-248288 describe a method of incorporating polyrotaxane in a surface layer of the photosensitive member. However, as a result of studies by the present inventors, it has been found that the photosensitive members described in Japanese Patent Applications Laid-Open Nos. 2012-181244 and 2011-248288 may have insufficient sensitivity. As a result of conducting a durability test of repeated use, it has been found that the photosensitive members described in Japanese Patent Applications Laid-Open Nos. 2012-181244 and 2011-248288 may have insufficient abrasion resistance in repeated use in a low temperature and low humidity environment.

In order to solve the technical disadvantages in the above-mentioned prior art, the present inventors have repeatedly studied a method of cross-linking polyrotaxane contained in the surface layer of the photosensitive member, the content ratio of the polyrotaxane, and the type of the material of the polyrotaxane. As a result of the study, it has been found that by using the electrophotographic photosensitive member according to the present disclosure, an electrophotographic photosensitive member having high sensitivity and excellent abrasion resistance even in repeated use in a low temperature and low humidity environment can be obtained.

The present inventors consider as follows a mechanism by which the electrophotographic photosensitive member according to the present disclosure can solve the above technical disadvantages.

As one of the causes of insufficient sensitivity of the photosensitive members described in Japanese Patent Applications Laid-Open Nos. 2012-181244 and 2011-248288, it is presumed that when polyrotaxane contained in the surface layer is cross-linked, charge transporting substances contained in the surface layer are aggregated together. The aggregation of the charge transporting substances acts as a trap during charge transport, which may lead to a decrease in sensitivity. When the surface layers of the photosensitive members described in Japanese Patent Applications Laid-Open Nos. 2012-181244 and 2011-248288 do not contain a charge transporting substance, the surface layer does not have a charge transporting function, so that the decrease in sensitivity is inevitable even if the surface layer is thinned.

On the other hand, in the electrophotographic photosensitive member according to the present disclosure, polyrotaxane and the charge transporting substance contained in the surface layer are bonded. The present inventors believe that by incorporating the charge transporting substance in a polymer containing the polyrotaxane, uniformity of the charge transporting substance in the surface layer is improved, which contributes to improvement of sensitivity.

In the electrophotographic photosensitive member according to the present disclosure, as will be described below, the effect obtained by using polyrotaxane is also considered to contribute significantly to the improvement of sensitivity. A cyclic molecule of the polyrotaxane is not constrained by a bond on a chain molecule of the polyrotaxane, but only constrained topologically. Therefore, the cyclic molecule can move on the chain molecule, and there is a degree of freedom in an arrangement state of many cyclic molecules existing on the chain molecule. As a factor that determines the arrangement state of the cyclic molecule, not only a chemical interaction with the surroundings but also a configurational entropy of the cyclic molecule on the chain molecule has a great influence. Thus, in order to minimize the configurational entropy, a force acts in a direction in which the cyclic molecule is uniformly arranged on the chain molecule. It is considered that due to this effect, the charge transporting substance bonded to the cyclic molecule is also uniformly arranged on the chain molecule, and as a result, the charge transporting substance is uniformly present in the surface layer. The uniform presence of the charge transporting substance in the surface layer makes it possible to effectively exert a charge transporting ability of the charge transporting substance.

As described above, in the electrophotographic photosensitive member according to the present disclosure, by incorporating the charge transporting substance in the polymer containing polyrotaxane, it is possible to prevent the charge transporting substances from aggregated together. Furthermore, due to the effect derived from the mobility of the cyclic molecule of the polyrotaxane, the charge transporting substance can be uniformly arranged in the surface layer. As a result, it is considered that in the electrophotographic photosensitive member according to the present disclosure, the charge transport ability is improved and high sensitivity can be obtained.

Another effect of incorporating the charge transporting substance in the polymer includes an increase in polymerization density of the polymer. In the electrophotographic photosensitive members described in Japanese Patent Applications Laid-Open Nos. 2012-181244 and 2011-248288, the cause of insufficient abrasion resistance is considered to be the fact that the polymerization density is low because the charge transporting substance is not incorporated in the polymer. In the electrophotographic photosensitive member according to the present disclosure, it is considered that since the charge transporting substance is bonded to polyrotaxane, the polymerization density does not decrease even if the content of the charge transporting substance is increased, and the electrophotographic photosensitive member having both high sensitivity and abrasion resistance can be obtained.

By the above mechanism, the effect of the present disclosure can be obtained.

Next, a specific embodiment of the electrophotographic photosensitive member for carrying out the present disclosure will be described.

[Electrophotographic Photosensitive Member]

The electrophotographic photosensitive member according to the present disclosure has a support and a photosensitive layer on the support.

Examples of a method of manufacturing the electrophotographic photosensitive member according to the present disclosure include a method of preparing a coating liquid for each layer described later, applying the coating liquid in the order of desired layers, and performing drying. Examples of methods for applying the coating liquids at this time include immersion-coating, spray coating, inkjet coating, roll coating, die coating, blade coating, curtain coating, wire bar coating, and ring coating. Among them, in view of efficiency and productivity, immersion-coating is preferable.

Hereinafter, the support and each layer will be described.

<Support>

In the present disclosure, the electrophotographic photosensitive member has the support. In the present disclosure, the support is preferably an electroconductive support having electroconductivity. Examples of the shape of the support include a cylindrical shape, a belt shape, and a sheet shape. Among these shapes, a cylindrical support is preferable. The surface of the support may be subjected to electrochemical treatment such as anodizing, blast treatment, cutting treatment, or the like.

As the material of the support, metal, resin, glass and the like are preferable.

Examples of the metal include aluminum, iron, nickel, copper, gold, stainless steel, and alloys thereof. Among these metals, an aluminum support using aluminum is preferable.

In addition, electroconductivity may be imparted to resins and glass through a treatment such as mixing or coating with an electroconductive material.

<Electroconductive Layer>

In the present disclosure, an electroconductive layer may be provided on the support. When the electroconductive layer is provided, scratches and unevenness on the surface of the support can be concealed, and reflection of light at the surface of the support can be controlled.

The electroconductive layer preferably contains electroconductive particles and a resin.

Examples of the material of the electroconductive particles include metal oxides, metals, and carbon black.

Examples of metal oxide include zinc oxide, aluminum oxide, indium oxide, silicon oxide, zirconium oxide, tin oxide, titanium oxide, magnesium oxide, antimony oxide, and bismuth oxide. Examples of metal include aluminum, nickel, iron, nichrome, copper, zinc, and silver.

Among them, metal oxides are preferably used as the electroconductive particle, and particularly, titanium oxide, tin oxide, and zinc oxide are more preferably used.

When the metal oxide is used as the electroconductive particle, the surface of the metal oxide may be treated with a silane coupling agent or the like, or the metal oxide may be doped with an element such as phosphorus or aluminum, or an oxide thereof.

In addition, the electroconductive particle may have a laminated constitution having a core particle and a coating layer that coats the particle. Examples of the core particle include titanium oxide, barium sulfate, and zinc oxide. Examples of the coating layer include metal oxides such as tin oxide.

Moreover, when the metal oxide is used as the electroconductive particle, the metal oxide preferably has a volume average particle diameter of 1 to 500 nm, more preferably 3 to 400 nm.

Examples of the resin include polyester resins, polycarbonate resins, polyvinyl acetal resins, acrylic resins, silicone resins, epoxy resins, melamine resins, polyurethane resins, phenol resins, and alkyd resins.

In addition, the electroconductive layer may further contain a concealing agent such as silicone oil, a resin particle, or titanium oxide.

The average thickness of the electroconductive layer is preferably 1 to 50 μm, particularly preferably 3 to 40 μm.

The electroconductive layer can be formed in such a way that a coating liquid for an electroconductive layer, the coating liquid containing the above-described respective materials and a solvent, is prepared, and a coating film of the coating liquid is formed and then dried. Examples of the solvent to be used for the coating liquid include alcohol-based solvents, sulfoxide-based solvents, ketone-based solvents, ether-based solvents, ester-based solvents and aromatic hydrocarbon-based solvents. Examples of the method for dispersing the electroconductive particle in the coating liquid for an electroconductive layer include a method using a paint shaker, a sand mill, a ball mill or a liquid collision type high-speed disperser.

<Undercoat Layer>

In the present disclosure, the undercoat layer is provided on the support or the electroconductive layer. By providing the undercoat layer, an adhesion function between layers can be enhanced to provide a charge injection blocking function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamideimide resin, and a cellulose resin.

Examples of the polymerizable functional group of the monomer having a polymerizable functional group include an isocyanate group, a block isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron transporting material, a metal oxide, a metal, an electroconductive polymer, and the like, for the purpose of increasing electrical characteristics. Among them, the electron transporting material and the metal oxide are preferably used.

Examples of the electron transporting material include a quinone compound, an imide compound, a benzoimidazole compound, a cyclopentadienylidene compound, a fluorenone compound, a xanthone compound, a benzophenone compound, a cyanovinyl compound, a halogenated aryl compound, a silole compound, and a boron-containing compound. The undercoat layer may be formed as a cured film by using an electron transporting material having a polymerizable functional group as an electron transporting material, and copolymerizing with an above-described monomer having a polymerizable functional group.

Examples of the metal oxide include indium tin oxide, tin oxide, indium oxide, titanium oxide, zinc oxide, aluminum oxide, and silicon dioxide. Examples of the metal can include gold, silver, and aluminum.

Further, the undercoat layer may further contain an additive.

An average thickness of the undercoat layer is preferably 0.1 to 50 μm, more preferably 0.2 to 40 μm, and particularly preferably 0.3 to 30 μm.

The undercoat layer can be formed in such a way that a coating liquid for an undercoat layer, the coating liquid containing the above-described respective materials and a solvent, is prepared, and a coating film of the coating liquid is formed and then dried and/or cured. Examples of the solvent to be used for the coating liquid include alcohol-based solvents, ketone-based solvents, ether-based solvents, ester-based solvents and aromatic hydrocarbon-based solvents.

<Photosensitive Layer>

A photosensitive layer of an electrophotographic photosensitive member is mainly classified into (1) a laminate type photosensitive layer and (2) a monolayer type photosensitive layer. The laminate type photosensitive layer (1) includes: a charge generation layer containing a charge generating substance; and a charge transport layer containing a charge transporting substance. The monolayer type photosensitive layer (2) includes a photosensitive layer containing both a charge generating substance and a charge transporting substance.

(1) Laminate Type Photosensitive Layer

The laminate type photosensitive layer includes a charge generation layer and a charge transport layer.

(1-1) Charge Generation Layer

The charge generation layer preferably contains a charge generating substance; and a resin.

Examples of the charge generating substance include an azo pigment, a perylene pigment, a polycyclic quinone pigment, an indigo pigment, and a phthalocyanine pigment. Among them, the azo pigment and the phthalocyanine pigment are preferable. Among the phthalocyanine pigments, an oxytitanium phthalocyanine pigment, a chlorogallium phthalocyanine pigment, and a hydroxygallium phthalocyanine pigment are preferable.

A content of the charge generating substance in the charge generation layer is preferably 40% to 85% by mass, more preferably 60% to 80% by mass, relative to the total mass of the charge generation layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Among them, the polyvinyl butyral resin is more preferable.

In addition, the charge generation layer may further contain an additive such as an antioxidant, an ultraviolet absorber, or the like. Specific examples thereof include a hindered phenol compound, a hindered amine compound, a sulfur compound, a phosphorus compound, and a benzophenone compound.

An average thickness of the charge generation layer is preferably 0.1 to 1 µm, and more preferably 0.15 to 0.4 µm.

The charge generation layer can be formed in such a way that a coating liquid for a charge generation layer, the coating liquid containing the above-described respective materials and a solvent, is prepared, and a coating film of the coating liquid is formed and then dried. Examples of the solvent to be used for the coating liquid include alcohol-based solvents, sulfoxide-based solvents, ketone-based solvents, ether-based solvents, ester-based solvents and aromatic hydrocarbon-based solvents.

(1-2) Charge Transport Layer

The charge transport layer preferably contains a charge transporting substance; and a resin.

Examples of the charge transporting substance include a polycyclic aromatic compound, a heterocyclic compound, a hydrazone compound, a styryl compound, an enamine compound, a benzidine compound, a triarylamine compound, and a resin having a group derived from these materials. Among them, the triarylamine compound is preferable.

When the electrophotographic photosensitive member does not have a protection layer described later, the charge transport layer is the surface layer in the present disclosure. That is, the charge transport layer has a polymerization product of a composition containing polyrotaxane and a charge transporting substance, and the polymerization product includes a bond between the polyrotaxane and the charge transporting substance.

When the charge transport layer is the surface layer, a preferable charge transporting substance contained in the charge transport layer as the surface layer will be described later.

The content of the charge transporting substance in the charge transport layer is preferably 20% by mass or more based on the total mass of the charge transport layer.

Examples of the resin include a polyester resin, a polycarbonate resin, an acrylic resin, and a polystyrene resin. Among them, the polycarbonate resin and the polyester resin are preferable. As the polyester resin, a polyarylate resin is particularly preferable.

A content ratio (mass ratio) of the charge transporting substance to the resin is preferably 4:10 to 20:10, and more preferably 5:10 to 12:10.

The charge transport layer may be formed as a cured film by polymerizing a composition containing a monomer having a polymerizable functional group. Examples of a reaction at this time include a thermal polymerization reaction, a photopolymerization reaction, and a radiation polymerization reaction. Examples of the polymerizable functional group of the monomer having a polymerizable functional group include an acrylic group, and a methacrylic group. As the monomer having the polymerizable functional group, a material having charge transport ability may be used.

The charge transport layer may contain an additive such as an antioxidant, an ultraviolet absorber, a plasticizer, a leveling agent, a lubricity imparting agent, and an abrasion resistance improving agent. Specific examples include a hindered phenol compound, a hindered amine compound, a sulfur compound, a phosphorus compound, a benzophenone compound, a siloxane modified resin, silicone oil, a fluororesin particle, a polystyrene resin particle, a polyethylene resin particle, a silica particle, an alumina particle, and a boron nitride particle.

An average thickness of the charge transport layer is preferably 5 to 50 µm, more preferably 8 to 40 µm, and particularly preferably 10 to 30 µm.

The charge transport layer can be formed in such a way that a coating liquid for a charge transport layer, the coating liquid containing the above-described respective materials and a solvent, is prepared, and a coating film of the coating liquid is formed and then dried. Examples of the solvent to be used for the coating liquid include alcohol-based solvents, ketone-based solvents, ether-based solvents, ester-based solvents, and aromatic hydrocarbon-based solvents. Among these solvents, ether-based solvents or aromatic hydrocarbon-based solvents are preferable.

(2) Monolayer Type Photosensitive Layer

The monolayer type photosensitive layer can be formed in such a way that a coating liquid for a photosensitive layer, the coating liquid containing a charge generating substance, a charge transporting substance, a resin, and a solvent, is prepared, and a coating film of this coating liquid is formed and is then dried. As the charge generating substance, the charge transporting substance and the resin, the materials exemplified in the above-described "(1) Laminate type photosensitive layer" are used.

When the electrophotographic photosensitive member does not have the protection layer described later, the monolayer type photosensitive layer is the surface layer in the present disclosure. That is, the monolayer type photosensitive layer has the polymerization product of the composition containing polyrotaxane and the charge transporting substance, and the polymerization product contains the bond between the polyrotaxane and the charge transporting substance.

When the monolayer type photosensitive layer is the surface layer, a preferable charge transporting substance contained in the monolayer type photosensitive layer as the surface layer will be described later.

<Protection Layer>

In the present disclosure, it is preferable to provide a protection layer on the photosensitive layer. The provision of the protection layer can improve durability.

The protection layer contains a charge transporting substance. Examples of the charge transporting substance include a polycyclic aromatic compound, a heterocyclic compound, a hydrazone compound, a styryl compound, an enamine compound, a benzidine compound, a triarylamine compound, and a resin having a group derived from these materials. Among them, the triarylamine compound is preferable.

The protection layer preferably contains electroconductive particles and/or a resin.

When the electrophotographic photosensitive member has the protection layer, the protection layer is the surface layer in the present disclosure. That is, the protection layer has the polymerization product of the composition containing polyrotaxane and the charge transporting substance, and the polymerization product includes the bond between the polyrotaxane and the charge transporting substance.

A particularly preferable charge transporting substance contained in the protection layer as the surface layer will be described later.

Examples of the electroconductive particle include a particle of a metal oxide such as titanium oxide, zinc oxide, tin oxide or indium oxide.

Examples of the resin include polyester resins, acrylic resins, phenoxy resins, polycarbonate resins, polystyrene resins, phenol resins, melamine resins, and epoxy resins. Among these resins, polycarbonate resins, polyester resins and acrylic resins are preferable.

The protection layer may be formed as a cured film by polymerizing a composition containing a monomer having a polymerizable functional group. Examples of a reaction at this time include a thermal polymerization reaction, a photopolymerization reaction, and a radiation polymerization reaction. Examples of the polymerizable functional group of the monomer having a polymerizable functional group include an acrylic group, and a methacrylic group. As the monomer having the polymerizable functional group, a material having charge transport ability may be used.

The protection layer may contain an additive such as an antioxidant, an ultraviolet absorber, a plasticizer, a leveling agent, a lubricity imparting agent, and an abrasion resistance improving agent. Specific examples include a hindered phenol compound, a hindered amine compound, a sulfur compound, a phosphorus compound, a benzophenone compound, a siloxane modified resin, silicone oil, a fluororesin particle, a polystyrene resin particle, a polyethylene resin particle, a silica particle, an alumina particle, and a boron nitride particle.

The average thickness of the protection layer is preferably 0.5 to 10 μm, more preferably 1 to 7 μm.

The protection layer can be formed in such a way that a coating liquid for a protection layer, the coating liquid containing the above-described respective materials and a solvent, is prepared, and a coating film of the coating liquid is formed and then dried and/or cured. Examples of the solvent to be used for the coating liquid include alcohol-based solvents, ketone-based solvents, ether-based solvents, sulfoxide-based solvents, ester-based solvents and aromatic hydrocarbon-based solvents.

As described above, the surface layer in the present disclosure corresponds to the charge transport layer when the photosensitive member is the laminate type photosensitive layer having no protection layer, and corresponds to the monolayer type photosensitive layer when the photosensitive member is the monolayer type photosensitive layer. When the photosensitive member has the protection layer on the photosensitive layer, the protection layer corresponds to the surface layer.

The surface layer of the electrophotographic photosensitive member according to the present disclosure will be described in more detail below.

[Surface Layer]

The surface layer has the polymerization product of the composition containing polyrotaxane and the charge transporting substance, and the polymerization product includes the bond between the polyrotaxane and the charge transporting substance.

The content ratio of the charge transporting substance in the surface layer is preferably 20% by mass or more based on the total mass of the surface layer. The content ratio of polyrotaxane in the surface layer is preferably 1% to 40% by mass based on the total mass of the surface layer. When the content ratio of the charge transporting substance and the polyrotaxane in the surface layer is set within the above range, a high effect of improving the sensitivity and abrasion resistance by cross-linking the charge transporting substance and the polyrotaxane thereby can be obtained.

Examples of compounds that can be preferably used as the charge transporting substance contained in the surface layer include compounds represented by formulas (CTM-1) to (CTM-16). Among them, it is more preferable to use the compounds represented by the formulas (CTM-1) to (CTM-14). When the charge transporting substance has a triarylamine skeleton, a more sensitive electrophotographic photosensitive member can be obtained.

(CTM-1)

(CTM-2)

(CTM-3)

(CTM-5)

(CTM-6)

(CTM-4)

(CTM-7)

-continued (CTM-8)

(CTM-9)

(CTM-10)

-continued

(CTM-11)

(CTM-12)

(CTM-13)

(CTM-14)

-continued (CTM-15)

(CTM-16)

The polyrotaxane used in the present disclosure will be described in detail below.

<Polyrotaxane>

Polyrotaxane is a molecule in which a chain molecule passes through an inside of a ring of a cyclic molecule, the cyclic molecule includes the chain molecule, and blocking groups are arranged at both terminals of the chain molecule so as to prevent the cyclic molecule from being detached. Herein, the inclusion refers to a state in which the chain molecule passes through the inside of the ring of the cyclic molecule.

Figure 2:
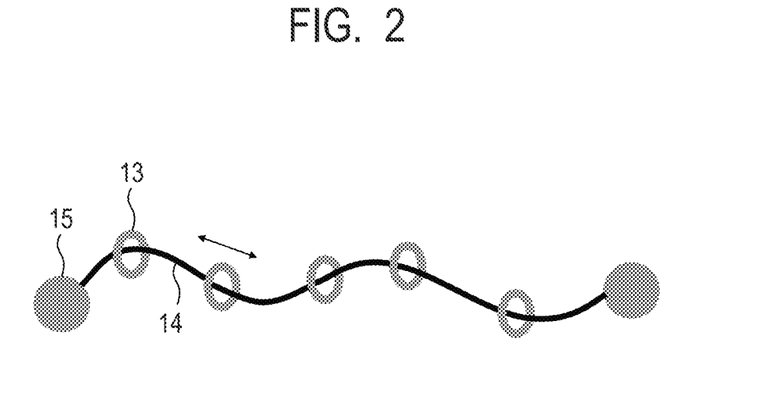
FIG. 2 is a schematic diagram showing the structure of polyrotaxane.

FIG. 2 is a schematic diagram showing the structure of polyrotaxane. In FIG. 2, a chain molecule 14 passes through the inside of the ring of the cyclic molecule 13, and the cyclic molecule 13 can move on the chain molecule 14. Blocking groups 15 are present at both terminals of the chain molecule 14, and the cyclic molecule 13 does not escape from the chain molecule 14.

<Chain Molecule of Polyrotaxane>

A chain molecule constituting a part of polyrotaxane is not particularly limited as long as it is a chain molecule or substance which is included by a cyclic molecule and is capable of being integrated with the cyclic molecule without using a covalent bond. In the present disclosure, the term "chain molecule" refers to molecules including polymers and all the other substances satisfying the above-mentioned requirements.

Further, in the present disclosure, the term "chain" in the "chain molecule" means a substantially "chain". That is, as long as a cyclic molecule which is a rotor can rotate, or a cyclic molecule can slide or move while including a chain molecule, the chain molecule may have a branched chain. As long as a cyclic molecule can slide or move while including a chain molecule, the chain molecule may be bent or have a helical shape. The length of the "chain" is not particularly limited as long as a cyclic molecule can slide or move while including a chain molecule.

Examples of the chain molecule include: hydrophilic polymers such as polyethylene glycol, polypropylene glycol, polytetrahydrofuran, polyvinyl alcohol, and polyvinylpyrrolidone, poly(meth)acrylic acid, cellulose-based resins (e.g., carboxymethylcellulose, hydroxyethylcellulose, and hydroxypropylcellulose), polyacrylamide, polyethylene oxide, polyvinyl acetal-based resins, polyvinyl methyl ether, polyamines, polyethyleneimine, casein, gelatin, and starch and/or copolymers thereof hydrophobic polymers such as polyolefin-based resins (e.g., polyethylene, polypropylene, and copolymer resins thereof with other olefin-based monomers), polyester resins, polyvinyl chloride resins, polystyrene-based resins (e.g., polystyrene and acrylonitrile-styrene copolymer resins), acrylic resins (e.g., polymethyl methacrylate, (meth)acrylic acid ester copolymers, and acrylonitrile-methyl acrylate copolymer resins), polycarbonate resins, polyurethane resins, vinyl chloride-vinyl acetate copolymer resins, and polyvinyl butyral resins; and derivatives or modifications thereof. Further examples thereof include polyisoprene, polyisobutylene, polybutadiene, and polydimethylsiloxane.

Among them, the chain molecule of polyrotaxane is preferably polyethylene glycol.

The weight average molecular weight of the chain molecule is preferably 1,000 to 1,000,000, more preferably 3,000 to 500,000, still more preferably 5,000 to 300,000.

It is preferred that both terminals of the chain molecule have a reactive functional group so as to facilitate a reaction with a blocking group to be described later. Examples of the reactive functional group, which depends on a blocking group to be used, include a hydroxyl group, an amino group, a carboxyl group, and a thiol group.

<Cyclic Molecule of Polyrotaxane>

Any cyclic molecule can be used as the cyclic molecule of polyrotaxane as long as it is capable of including the chain molecule described above.

In the present disclosure, the term "cyclic molecule" refers to various cyclic substances including a molecule having a cyclic structure. The term "cyclic molecule" refers to molecules or substances which are substantially cyclic. The term "substantially cyclic" is intended to include those which are not completely ring-closed, and also includes those which have a helical structure in which one end and the other end of a molecule overlap together without being bonded together.

The cyclic molecule is not particularly limited, and examples thereof include various cyclodextrins (e.g., α-cyclodextrin, β-cyclodextrin, γ-cyclodextrin, dimethyl cyclodextrin, glycosyl cyclodextrin, and derivatives or modifications thereof), crown ethers, benzocrowns, dibenzocrowns, dicyclohexanocrowns, and derivatives or modifications thereof.

Among them, the cyclic molecule of polyrotaxane is preferably a substituted or unsubstituted α-cyclodextrin. The substituent optionally carried on α-cyclodextrin is not particularly limited, and examples thereof include a hydroxyalkyl group, a carboxyl group, an acryloyloxy group, a methacryloyloxy group, a polycaprolactone group, and a thiol group.

The cyclodextrins and crown ethers described above differ in the size of the ring of the cyclic molecule depending on the type. Therefore, the cyclic molecule to be used may be selected depending on, for example, the width of a chain molecule to be used and the hydrophilicity/hydrophobicity or ionicity of the chain molecule.

When the cyclic molecule is a cyclodextrin, a ratio (hereinafter, also referred to as an inclusion ratio) of the number of cyclic molecules through which the straight chain molecule passes to the maximum number of cyclic molecules through which the straight chain molecule can pass is preferably 0.03 to 0.6. If the ratio is less than 0.03, the mobility of the cyclic molecule of polyrotaxane may not be fully utilized. If the ratio exceeds 0.6, the mobility of the cyclic molecule of the polyrotaxane decreases, and in some cases, the effects of improving durability and sensitivity cannot be sufficiently obtained.

As a combination of the chain molecule and the cyclic molecule of polyrotaxane, it is preferable to use polyethylene glycol as the chain molecule and α-cyclodextrin as the cyclic molecule. The above substances are materials which are excellent in ability to include a chain molecule by a cyclic molecule and mechanical strength, and are suitable for exhibiting the effects of the present disclosure.

The cyclic molecule has a reactive functional group on the outer side of its ring. When cyclic molecules are bonded together, a reaction can be easily performed through use of the reactive functional group. Examples of the reactive functional group, which depends on a cross-linking agent to be used, include a hydroxyl group, an amino group, a carboxyl group, a thiol group, and an aldehyde group. Further, it is desired to use a group which does not react with a blocking group during a block formation reaction to be described below.

<Blocking Group of Chain Molecule>

The polyrotaxane includes two kinds of molecules, i.e., a cyclic molecule as a rotor and a chain molecule as an axis, and blocking groups are arranged at both terminals of the axis so as to prevent the rotor from being detached from the axis. Herein, the blocking group refers to various functional groups including low-molecular-weight functional groups and high-molecular-weight functional groups.

There is given a method involving using bulky groups as the blocking groups so as to physically prevent a cyclic molecule from being detached from a chain molecule. Further, there is also given a method involving using ionic groups as the blocking groups so as to electrically prevent a cyclic molecule from being detached from a chain molecule through the repulsion of the ionicity of the blocking groups and the ionicity of the cyclic molecule.

Specific examples of the blocking groups include: dinitrophenyl groups such as a 2,4-dinitrophenyl group and a 3,5-dinitrophenyl group; cyclodextrins; adamantane groups; trityl groups; fluoresceins; pyrenes; and derivatives or modifications thereof.

<Method of Preparing Polymerization Product Containing Bond Between Polyrotaxane and Charge Transporting Substance>

First, a cyclic molecule and a chain molecule are mixed to prepare a pseudopolyrotaxane in which the chain molecule passes through the inside of a ring of the cyclic molecule. The pseudopolyrotaxane is a molecule having a polyrotaxane structure in which both terminals of a chain molecule are not sealed with a blocking group.

The amount of the cyclic molecule through which the chain molecule is caused to pass can be controlled by a mixing time between the cyclic molecule and the chain molecule, the molecular weight of the chain molecule, and the like. It is desired that the chain molecule be not densely included in the cyclic molecule. When the chain molecule is not densely included in the cyclic molecule, the degree of freedom of mobility of the cyclic molecule with respect to the chain molecule is held, and a surface layer having both excellent flexibility and recoverability can be obtained Next, both terminals of the chain molecule are blocked with blocking groups so as to prevent the cyclic molecule from being detached from the pseudopolyrotaxane obtained in the above to prepare a polyrotaxane.

Then, a composition containing the obtained polyrotaxane and the charge transporting substance is prepared, and the obtained composition is polymerized to obtain a polymerization product including a bond between the polyrotaxane and the charge transporting substance. At this time, before preparing the composition, an operation of appropriately introducing a polymerizable functional group into the reactive functional group of the polyrotaxane may be performed. Examples of polymerization unit include a thermal polymerization reaction, a photopolymerization reaction, and a radiation polymerization reaction.

[Process Cartridge, Electrophotographic Image Forming Apparatus]

The process cartridge according to the present disclosure is characterized by integrally supporting the electrophotographic photosensitive member described above and at least one unit selected from the group consisting of a charging unit, a developing unit, a transfer unit, and a cleaning unit and being detachably attachable to a main body of an electrophotographic image forming apparatus.

Further, the electrophotographic image forming apparatus according to the present disclosure is characterized by including the electrophotographic photosensitive member described above, a charging unit, an exposing unit, a developing unit, and a transfer unit.

Figure 1:
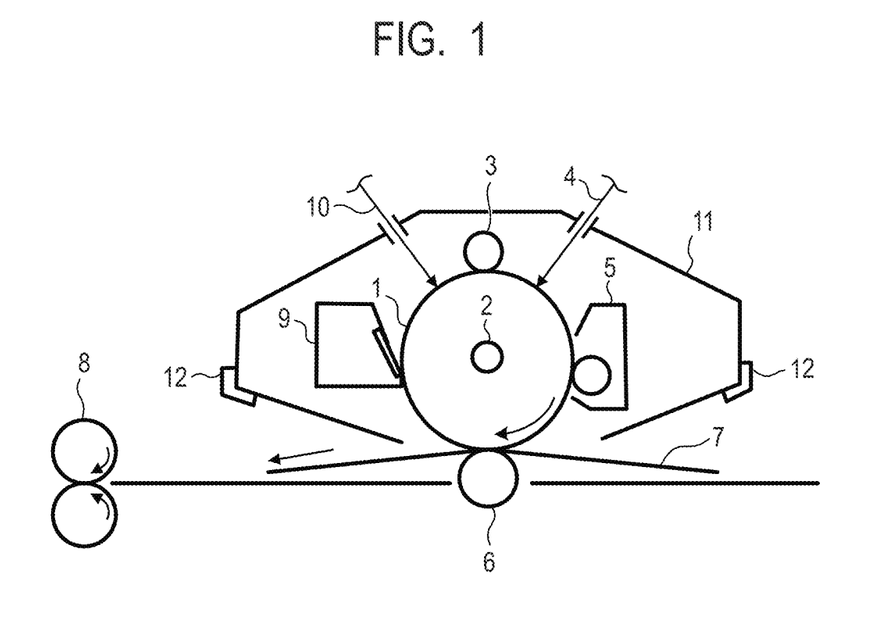
FIG. 1 is a diagram showing an example of a schematic configuration of an electrophotographic image forming apparatus having a process cartridge including an electrophotographic photosensitive member.

FIG. 1 shows an example of a schematic configuration of an electrophotographic image forming apparatus having a process cartridge including an electrophotographic photosensitive member.

Reference numeral 1 denotes a cylindrical electrophotographic photosensitive member which is rotationally driven on a shaft 2 at a predetermined peripheral speed in a direction of an arrow. A surface of the electrophotographic photosensitive member 1 is charged to a predetermined positive or negative potential by a charging unit 3. In the drawings, a roller charging method by a roller type charging member is shown, but a charging method such as a corona charging method, a proximity charging method, an injection charging method, or the like, may be adopted. A surface of the charged electrophotographic photosensitive member 1 is irradiated with exposure light 4 from an exposing unit (not shown), and an electrostatic latent image corresponding to desired image information is formed. The electrostatic latent image formed on the surface of the electrophotographic photosensitive member 1 is developed by a toner contained in a developing unit 5, and a toner image is formed on the surface of the electrophotographic photosensitive member 1. The toner image formed on the surface of the electrophotographic photosensitive member 1 is transferred to a transfer material 7 by a transfer unit 6. The transfer material 7 onto which the toner image is transferred is conveyed to a fixing unit 8, and is subjected to a toner image fixing process to be printed out of the electrophotographic image forming apparatus. The electrophotographic image forming apparatus may have a cleaning unit 9 for removing an attachment such as the toner remaining on the surface of the electrophotographic photosensitive member 1, or the like, after transfer. Further, a so-called cleanerless system may be used in which the attachment is removed by the developing unit 5, or the like, without separately providing the cleaning unit 9. The electrophotographic image forming apparatus may include an electricity eliminating instrument that performs electricity elimination on the surface of the electrophotographic photosensitive member 1 by a pre-exposure light 10 from a pre-exposing unit (not shown). Further, in order to detach and attach the process cartridge 11 according to the present disclosure to the main body of the electrophotographic image forming apparatus, a guide unit 12 such as a rail may be provided.

The electrophotographic photosensitive member of the present disclosure can be used for a laser beam printer, an LED printer, a copying machine, a facsimile, and a multi-function machine thereof, and the like.

According to the present disclosure, it is possible to provide an electrophotographic photosensitive member having high sensitivity and excellent abrasion resistance even in repeated use in a low temperature and low humidity environment.

According to the present disclosure, it is possible to provide a process cartridge and an electrophotographic image forming apparatus that contribute to formation of a high-quality image for a long period of time.

EXAMPLES

Hereinafter, the present disclosure will be described in more detail with reference to Examples and Comparative Examples. The present disclosure is not limited to the following examples as long as the gist of the present disclosure is not exceeded. In the description of the following Examples, "part" is on a mass basis unless otherwise defined.

Synthesis Example 1: Synthesis of Polyrotaxane AOPR20-1 Having Acryloyloxy Group (Activation of Both Terminals of Chain Molecule)

100 g of polyethylene glycol (hereinafter, referred to as PEG; weight average molecular weight of 20,000) were dissolved in 500 ml of methylene chloride, and the solution was placed in an argon atmosphere. To the solution, 20 g of 1,1-carbonyldiimidazole was added, and the resultant solution was reacted with stirring at room temperature for 24 hours in an argon atmosphere.

The reaction product thus obtained was poured into diethyl ether stirred at a high speed. After the resultant was left to stand still for 1 hour, a liquid containing a precipitate was centrifuged to take out the precipitate. Thus, 90 g of a product were obtained.

The product thus obtained was dissolved in 500 ml of methylene chloride, and the solution was added dropwise to 500 ml of ethylene diamine over 3 hours. After the dropwise addition, the product was stirred for 1 hour. The reaction product thus obtained was subjected to a rotary evaporator to remove methylene chloride and then dissolved in 1 liter of water. The solution was placed in a dialysis tube (molecular weight cut-off: 8,000), and dialyzed in water for 7 days.

The obtained dialysate was dried with a rotary evaporator, and the dried product was further dissolved in 500 ml of methylene chloride. The solution was added to 1 liter of diethyl ether to re-precipitate the dried product. The precipitate was removed from the solution containing the precipitate by centrifugation and vacuum dried at a temperature of 40° C. for 2 hours to obtain 68 g of a product in which amino groups were introduced at both terminals of PEG.

(Preparation of Pseudopolyrotaxane)

The following compounds were added to 40 mL of water at a temperature of 80° C., stirred and mixed to be dissolved.
  3.5 g of α-cyclodextrin
  14.0 g of product in which amino groups were introduced at both terminals of PEG (weight average molecular weight 20,000)

The obtained solution was cooled and left to stand still at a temperature of 5° C. for 16 hours, and white pasty precipitate formed was batched off and freeze-dried to remove water, and thus to prepare a pseudopolyrotaxane.

13.7 g of the pseudopolyrotaxane obtained in the above and the following compound were mixed with a solution dissolved in 102.2 mL of dry dimethylformamide (DMF), and reacted at a temperature of 5° C. for 24 hours under argon inclusion.
  Diisopropylethylamine 2.6 mL
  Adamantane acetic acid 2.9 g
  1-Hydroxybenzotriazole 2.1 g
  Benzotriazole-1-yloxytris(dimethylamino)phosphonium hexafluorophosphate (BOP reagent) 6.2 g Then, 75 mL of methanol was added to the mixture, and centrifugation was performed. In addition, the mixture was washed twice with each of a solvent in which methanol and DMF were mixed in equal amounts and 100 mL of methanol, centrifuged, and then vacuum dried. The obtained solid was dissolved in 75 mL of dimethyl sulfoxide (DMSO) and added dropwise to 500 mL of water to cause precipitation, and centrifugation was performed to remove the supernatant. In addition, the mixture was washed with 200 mL of water and 200 mL of methanol, centrifuged, and vacuum dried to obtain 5.0 g of polyrotaxane (PR20) in which both terminals of PEG were sealed with an adamantane group.

(Modification of Polyrotaxane (i) Hydroxypropylation)

5.0 g of the PR20 obtained in the above was dissolved in 70 mL of 1N NaOH aqueous solution. To the mixture was added 45 g, large excess amount, of propylene oxide. After stirring at room temperature for 24 hours, the reaction mixture was neutralized with hydrochloric acid. The solution was dialyzed for 48 hours with a dialysis tube (fraction molecular weight: 12,000) in flowing tap water. The mixture was further dialyzed for 3 hours in 500 ml of purified water twice. The mixture was then freeze-dried to give a product (HAPR20). Yield was 4.9 g.

(Modification of Polyrotaxane (ii) Introduction of Polycaprolactone Group)

1.0 g of the HAPR20 obtained in the above was placed in a three-necked flask, and 4.5 g of ε-caprolactone was introduced under a slow nitrogen flow. After stirring the content homogeneously at 100° C. for 30 minutes by a mechanical stirrer, the reaction temperature was raised to 130° C., and then, 0.016 g of tin 2-ethylhexanoate diluted with ethyl acetate (50% by mass solution) was added thereto. The mixture was allowed to react for 5 hours, to obtain 5.5 g of a reaction product (HAPR20-g-PCL).

(Modification of Polyrotaxane (iii) Introduction of Acryloyloxy Group)

5.5 g of HAPR20-g-PCL obtained in the above was dissolved in 2.5 g of ethyl acetate, and 0.46 g of 2-(acryloyloxy)ethyl Isocyanate was added dropwise thereto. The mixture was allowed to react at 80° C. for 4 hours. The consumption of peak (2270 cm$^{-1}$) of the isocyanate group was confirmed by infrared spectroscopy (IR) measurement, to obtain a 70% by mass ethyl acetate solution of the reaction product (polyrotaxane having acryloyloxy group, AOPR20-1).

Synthesis Example 2: Synthesis of Polyrotaxane MOPR20 Having Methacryloyloxy Group 5.5 g of HAPR20-g-PCL obtained in Synthesis Example 1 was dissolved in 2.5 g of ethyl acetate, and 0.46 g of 2-methacryloyloxyethyl Isocyanate was added dropwise thereto. The mixture was allowed to react at 80° C. for 4 hours. The consumption of peak (2270 cm$^{-1}$) of the isocyanate group was confirmed by IR measurement, to obtain a 70% by mass ethyl acetate solution of the reaction product (polyrotaxane having methacryloyloxy group, MOPR20).

Synthesis Example 3: Synthesis of Polyrotaxane AOPR05 Having Acryloyloxy Group

In Synthesis Example 1, the weight average molecular weight of polyethylene glycol having amino groups at both terminals was changed to 5,000. A polyrotaxane AOPR05 having an acryloyloxy group was obtained in the same manner as in Synthesis Example 1 except for the above.

Synthesis Example 4: Synthesis of Polyrotaxane AOPR35 Having Acryloyloxy Group

In Synthesis Example 1, the weight average molecular weight of polyethylene glycol having amino groups at both terminals was changed to 35,000. A polyrotaxane AOPR35 having an acryloyloxy group was obtained in the same manner as in Synthesis Example 1 except for the above.

Synthesis Example 5: Synthesis of Polyrotaxane AOPR20-2 Having Acryloyloxy Group In Synthesis Example 1, the chain molecule was changed from polyethylene glycol (weight average molecular weight 20,000) to polypropylene glycol (hereinafter, also referred to as PPG; weight average molecular weight 5,000), and the cyclic molecule was changed from α-cyclodextrin to β-cyclodextrin. A polyrotaxane AOPR20-2 having an acryloyloxy group was obtained in the same manner as in Synthesis Example 1 except for the above.

Synthesis Example 6: Synthesis of Polyrotaxane AOPR20-3 Having Acryloyloxy Group In Synthesis Example 5, β-cyclodextrin was changed to γ-cyclodextrin. A polyrotaxane AOPR20-3 having an acryloyloxy group was obtained in the same manner as in Synthesis Example 5 except for the above.

Synthesis Example 7: Synthesis of Polyrotaxane AOPR20-4 Having Acryloyloxy Group In Synthesis Example 6, the chain molecule was changed from polypropylene glycol (weight average molecular weight 5,000) to polybutadiene (hereinafter, also referred to as PBD; weight average molecular weight 2,800) having a hydroxyl group at the terminal. A polyrotaxane AOPR20-4 having an acryloyloxy group was obtained in the same manner as in Synthesis Example 6 except for the above.

Example 1

<Manufacturing of Electrophotographic Photosensitive Member>

An aluminum cylinder (JIS-A3003, aluminum alloy) with a diameter of 24 mm and a length of 257 mm was used as the support (electroconductive support).

Next, the following materials were provided as materials used for the electroconductive layer.
- 214 parts of titanium oxide (TiO$_2$) particles (average primary particle diameter of 230 nm) coated with oxygen-deficient tin oxide (SnO$_2$) as metal oxide particles
- 132 parts of phenol resin (monomer/oligomer of phenol resin) (trade name: PLYOPHEN J-325, manufactured by DIC Corporation, resin solid content: 60% by mass) as a binder material
- 98 parts of 1-methoxy-2-propanol as a solvent These materials were loaded into a sand mill using 450 parts of glass beads each having a diameter of 0.8 mm, and were then subjected to a dispersion treatment under the following conditions to provide a dispersion liquid: a rotation number of 2,000 rpm, a dispersion treatment time of 4.5 hours, and a setting temperature of cooling water of 18° C. The glass beads were removed from the dispersion liquid with a mesh (opening: 150 μm). A silicone resin particle as a surface roughening material (trade name: Tospearl 120, manufactured by Momentive Performance Materials Inc., average particle diameter of 2 μm) was added to the obtained dispersion liquid. An amount of the silicone resin particles added was 10% by mass based on a total mass of the metal oxide particle and the binder material in the dispersion liquid after the glass beads were removed. Additionally, a silicone oil as a leveling agent (trade name: SH28PA, manufactured by Dow Corning Toray Co., Ltd.) was added to the dispersion liquid such that the amount of the silicone oil was 0.01% by mass based on the total mass of the metal oxide particle and the binder material in the dispersion liquid. Next, a mixed solvent of methanol and 1-methoxy-2-propanol (mass ratio of 1:1) was added to the dispersion liquid such that the total mass of the metal oxide particle, the binder material, and the surface roughening material in the dispersion liquid (namely, mass of the solid content) was 67% by mass based on the mass of the dispersion liquid. Thereafter, the solution was stirred to prepare a coating liquid for an electroconductive layer. The coating liquid for an electroconductive layer was applied onto the support by dip coating, and the resultant coating film was heated for 1 hour at 140° C. to form an electroconductive layer having a thickness of 30 μm.

Next, the following materials were provided as materials used for the undercoat layer.
- 3.11 parts of electron transporting substance represented by the following formula (E-1)
- 6.49 parts of block isocyanate (trade name: SBB-70P, manufactured by Asahi Kasei Corporation)
- 0.40 parts of styrene-acrylic resin (trade name: UC-3920, manufactured by Toagosei Co., Ltd.)
- 0.05 parts of zinc (II) hexanoate (manufactured by Mitsuwa Chemicals Co., Ltd.) as a catalyst These materials were dissolved in a mixed solvent of 48 parts of 1-butanol and 24 parts of acetone. To this solution, 1.8 parts of a silica slurry (product name: IPA-ST-UP manufactured by Nissan Chemical Industries, Limited, solid content concentration: 15% by mass, viscosity: 9 mPa·s) dispersed in isopropyl alcohol was added and stirred for 1 hour. Thereafter, the mixture was pressed and filtered using a Teflon (registered trademark) filter (product name: PF020 manufactured by ADVANTEC CO., LTD.). The obtained coating liquid for an undercoat layer was applied onto the electroconductive layer by dip coating, and the resultant coating film was heated for 40 minutes at 170° C. to form an undercoat layer having a thickness of 0.7 μm.

(E-1)

Next, 10 parts of a crystalline form of hydroxygallium phthalocyanine, which had peaks at positions of 7.5° and 28.4° in a chart obtained from CuKα characteristic X-ray diffraction, and 5 parts of a polyvinyl butyral resin (trade name: ESREC BX-1; produced by Sekisui Chemical Co., Ltd.) were provided. These materials were added to 200 parts of cyclohexanone, and the solid was dispersed for 6 hours in a sand mill apparatus which used glass beads having a diameter of 0.9 mm. To the dispersion liquid, 150 parts of cyclohexanone and 350 parts of ethyl acetate were further added to dilute the dispersion liquid, and a coating liquid for a charge generation layer was obtained. The obtained coating liquid was applied onto the undercoat layer by dip coating, and dried for 10 minutes at 95° C. to form a charge generation layer having a thickness of 0.20 μm.

The measurement with the X-ray diffraction was performed under the following conditions.

[Powder X-Ray Diffraction Measurement]

Used measurement instrument: X-ray diffractometer RINT-TTRII, manufactured by Rigaku Corporation X-ray tube bulb: Cu Tube voltage: 50 KV Tube current: 300 mA Scanning method: 2θ/θ scan Scanning speed: 4.0°/min Sampling interval: 0.02°

Start angle (2θ): 5.0°

Stop angle (2θ): 40.0°

Attachment: standard sample holder

Filter: nonuse

Incident monochrome: used

Counter monochromator: nonuse

Divergence slit: open

Divergence vertical restriction slit: 10.00 mm

Scattering slit: open

Light receiving slit: open

Flat plate monochromator: used

Counter: scintillation counter

Next, the following materials were provided as materials used for the charge transport layer.

14 parts of charge transporting substance represented by the formula (CTM-1)

4 parts of reactive monomer represented by the following formula (M-1)

2.3 parts of 70% by mass ethyl acetate solution of AOPR20-1

0.2 parts of siloxane-modified acrylic compound (BYK-3550, manufactured by Big Chemie Japan Co., Ltd.)

1 part of a compound (1-hydroxy-cyclohexyl-phenyl-ketone) represented by the following formula (I)

9 parts of polycarbonate (trade name: Iupilon Z400, manufactured by Mitsubishi Engineering-Plastics Corporation)

(M-1)

(I)

These materials were dissolved in a mixed solvent of 20 parts of 2-propanol/40 parts of tetrahydrofuran to prepare a coating liquid for a charge transport layer.

The coating liquid for a charge transport layer was applied onto the charge generation layer by dip coating to form a coating film, and the resultant coating film was dried for 6 minutes at 50° C. Thereafter, in the atmosphere, using an electrodeless lamp H bulb (manufactured by Heraeus Holding), while the support (body to be irradiated) was rotated at a speed of 300 rpm under the condition of a lamp intensity of 0.4 W/cm², the coating film was irradiated with ultraviolet rays for 2.0 seconds. Next, in the atmosphere, the coating film was naturally cooled until the temperature of the coating film reached 25° C., and then heat-treated for 1 hour under the condition that the temperature of the coating film was 120° C., to form a charge transport layer having a thickness of 15 μm. In this way, the electrophotographic photosensitive member according to Example 1 was prepared.

Example 2

An electroconductive layer, an undercoat layer, and a charge generation layer were formed on the support in the same manner as in Example 1.

Next, the following materials were provided as materials used for the charge transport layer.
- 6 parts of charge transporting substance represented by the following formula (C-1)
- 3 parts of charge transporting substance represented by the following formula (C-2)
- 1 part of charge transporting substance represented by the following formula (C-3)
- 10 parts of polycarbonate (trade name: Iupilon Z400, manufactured by Mitsubishi Engineering-Plastics Corporation)
- 0.02 parts of polycarbonate resin having a copolymer unit of the following formula (C-4) and the following formula (C-5) (x/y=0.95/0.05: viscosity average molecular weight=20,000)

(C-1)

(C-2)

(C-3)

(C-4)

(C-5)

These materials were dissolved in a mixed solvent of 25 parts of ortho-xylene/25 parts of methyl benzoate/25 parts of dimethoxymethane to prepare a coating liquid for a charge transport layer. The coating liquid for a charge transport layer was applied onto the charge generation layer by dip coating to form a coating film, and the resultant coating film was dried for 30 minutes at 120° C. to form a charge transport layer having a thickness of 12 μm.

Next, the following materials were provided as materials used for the protection layer.
- 14 parts of charge transporting substance represented by the formula (CTM-1)
- 4 parts of a compound represented by the formula (M-1)
- 1.5 parts of 70% by mass ethyl acetate solution of AOPR20-1
- 0.2 parts of siloxane-modified acrylic compound (BYK-3550, manufactured by Big Chemie Japan Co., Ltd.)
- 1 part of a compound (1-hydroxy-cyclohexyl-phenyl-ketone) represented by the formula (I)

These materials were dissolved in a mixed solvent of 72 parts of 2-propanol/8 parts of tetrahydrofuran to prepare a coating liquid for a protection layer.

The coating liquid for a protection layer was applied onto the charge transport layer by dip coating to form a coating film, and the resultant coating film was dried for 6 minutes at 50° C. Thereafter, in the atmosphere, using an electrodeless lamp H bulb (manufactured by Heraeus Holding), while the support (body to be irradiated) was rotated at a speed of 300 rpm under the condition of a lamp intensity of 0.4 W/cm$^2$, the coating film was irradiated with ultraviolet rays for 2.0 seconds. Next, in the atmosphere, the coating film was naturally cooled until the temperature of the coating film reached 25° C., and then heat-treated for 1 hour under the condition that the temperature of the coating film was 120° C., to form a protection layer having a thickness of 3 μm. In this way, the electrophotographic photosensitive member according to Example 2 was prepared.

Example 3

An electroconductive layer, an undercoat layer, a charge generation layer, and a charge transport layer were formed on the support in the same manner as in Example 2. The coating liquid for a protection layer was prepared in the same manner as in Example 2 except that 1 part of the compound (1-hydroxy-cyclohexyl-phenyl-ketone) represented by the formula (I) was not used.

The coating liquid for a protection layer was applied onto the charge transport layer by dip coating to form a coating film, and the resultant coating film was dried for 4 minutes at 35° C. After that, in a nitrogen atmosphere, under the conditions of an acceleration voltage of 57 kV and a beam current of 5.3 mA, a distance between the support (body to be irradiated) and an electron beam irradiation window was set at 25 mm, and the coating film was irradiated with an electron beam for 4.8 seconds, while the support (body to be irradiated) was rotated at a speed of 300 rpm. The absorbed dose of the electron beam at this time was measured, and as a result, was 20 kGy. After that, in a nitrogen atmosphere, the temperature was raised from 25° C. to 137° C. over 10 seconds, and the coating film was heated. A concentration of oxygen after the electron beam irradiation and before the subsequent heat treatment was 10 ppm or less. Next, in the atmosphere, the coating film was naturally cooled until the temperature of the coating film reached 25° C., and then heat-treated for 10 minutes under the condition that the temperature of the coating film was 100° C., to form a protection layer having a thickness of 3 μm. In this way, the electrophotographic photosensitive member according to Example 3 was prepared.

Examples 4 to 21

An electrophotographic photosensitive member was prepared in the same manner as in Example 3 except that the type and content of the polyrotaxane used for the protection layer, the type and content of the charge transporting substance, and the type and content of the reactive monomer in Example 3 were changed as shown in Table 1.

A reactive monomer (M-2) in Table 1 is a compound represented by the following formula (M-2).

(M-2)

Example 22

An electroconductive layer, an undercoat layer, a charge generation layer, and a charge transport layer were formed on the support in the same manner as in Example 2.

Next, the following materials were provided as materials used for the protection layer.
14 parts of charge transporting substance represented by the formula (CTM-8)
4 parts of reactive monomer represented by the following formula (M-3)
1.5 parts of 70% by mass ethyl acetate solution of HAPR20-g-PC
0.2 parts of siloxane-modified acrylic compound (BYK-3550, manufactured by Big Chemie Japan Co., Ltd.)
1.93 parts of isocyanurate compound Duranate TPA-100

(M-3)

These materials were dissolved in a mixed solvent of 72 parts of 2-propanol/8 parts of tetrahydrofuran to prepare a coating liquid for a protection layer.

The coating liquid for a protection layer was applied onto the charge transport layer by dip coating, and dried for 1 hour at 120° C. to form a protection layer having a thickness of 3 μm. In this way, the electrophotographic photosensitive member according to Example 22 was prepared.

Example 23

The charge transporting substance used for the protection layer in Example 22 was changed from (CTM-8) to (CTM-10). An electrophotographic photosensitive member according to Example 23 was prepared in the same manner as in Example 22 except for the above condition.

Example 24

An electroconductive layer, an undercoat layer, a charge generation layer, and a charge transport layer were formed on the support in the same manner as in Example 2.

Next, the following materials were provided as materials used for the protection layer.
11 parts of charge transporting substance represented by the formula (CTM-8)
3 parts of reactive monomer represented by the following formula (M-4)
6.0 parts of 70% by mass ethyl acetate solution of HAPR20-g-PCL
0.2 parts of siloxane-modified acrylic compound (BYK-3550, manufactured by Big Chemie Japan Co., Ltd.)
0.05 parts of dodecylbenzene sulfonic acid (M-4)

These materials were dissolved in a mixed solvent of 72 parts of 2-propanol/8 parts of tetrahydrofuran to prepare a coating liquid for a protection layer.

The coating liquid for a protection layer was applied onto the charge transport layer by dip coating, and dried for 1 hour at 135° C. to form a protection layer having a thickness of 3 μm. In this way, the electrophotographic photosensitive member according to Example 24 was prepared.

Example 25

The charge transporting substance used for the protection layer in Example 24 was changed from (CTM-8) to (CTM-10). An electrophotographic photosensitive member according to Example 25 was prepared in the same manner as in Example 24 except for the above condition.

Comparative Example 1

An electroconductive layer, an undercoat layer, and a charge generation layer were formed on the support in the same manner as in Example 1.

Next, the following materials were provided as materials used for the charge transport layer.

- 14 parts of charge transporting substance represented by the following formula (CTM-17)
- 4 parts of reactive monomer represented by the formula (M-3)
- 2.3 parts of 70% by mass ethyl acetate solution of HAPR20-g-PCL
- 0.2 parts of siloxane-modified acrylic compound (BYK-3550, manufactured by Big Chemie Japan Co., Ltd.)
- 1.93 parts of isocyanurate compound Duranate TPA-100
- 9 parts of polycarbonate (trade name: Iupilon Z400, manufactured by Mitsubishi Engineering-Plastics Corporation)

(CTM-17)

These materials were dissolved in a mixed solvent of 20 parts of 2-propanol/40 parts of tetrahydrofuran to prepare a coating liquid for a charge transport layer.

The coating liquid for a charge transport layer was applied onto the charge generation layer by dip coating, and dried for 1 hour at 120° C. to form a charge transport layer having a thickness of 15 μm. In this way, the electrophotographic photosensitive member according to Comparative Example 1 was prepared.

Comparative Example 2

The charge transporting substance used for the protection layer in Example 22 was changed from (CTM-8) to (CTM-17). An electrophotographic photosensitive member according to Comparative Example 2 was prepared in the same manner as in Example 22 except for the above condition.

Comparative Example 3

An electrophotographic photosensitive member according to Comparative Example 3 was prepared in the same manner as in Comparative Example 2 except that the amount of the reactive monomer (M-3) used for the protection layer in Comparative Example 2 was changed from 4 parts to 18 parts, and the charge transporting substance (CTM-17) was not used.

Comparative Example 4

The charge transporting substance used for the protection layer in Example 24 was changed from (CTM-8) to (CTM-17). An electrophotographic photosensitive member according to Comparative Example 4 was prepared in the same manner as in Example 24 except for the above condition.

Table 1 shows the content ratio of polyrotaxane and the content ratio of the charge transporting substance in the surface layer of each of the electrophotographic photosensitive members according to Examples 1 to 25 and Comparative Examples 1 to 4 based on the total mass of the surface layer.

[Evaluation]

<Evaluation: Abrasion Resistance>

The abrasion resistance was evaluated under the following conditions using the photosensitive members prepared in Examples 1 to 25 and Comparative Examples 1 to 4. A laser beam printer (trade name: HP LaserJet Enterprise Color M553dn, manufactured by Hewlett-Packard Development Company, L.P.) was used as an evaluation device, and a drive system was modified so that a rotation speed of the electrophotographic photosensitive member was 350 mm/sec. In a low temperature and low humidity environment with a temperature of 15° C. and a relative humidity of 10%, the electrophotographic photosensitive member prepared was attached to a cartridge, and 10,000 sheets of paper were continuously passed using an A4 test pattern of a printing rate of 1%.

A spectral interference displacement type multilayer film thickness meter (spectral unit: SI-T80, manufactured by KEYENCE CORPORATION) was used for film thickness measurement. A thickness from an outer surface of the electrophotographic photosensitive member to an outer surface of the charge generation layer was measured at 1 mm intervals in a direction of a generating line and in a circumferential direction of the cylindrical electrophotographic photosensitive member, and the average was taken to obtain a combined thickness of the charge transport layer and the protection layer. A difference in film thickness before and after continuous paper passing was calculated as an amount of abrasion (μm). It was judged that the effect of the present disclosure was obtained when the amount of abrasion was 0.2 μm or less.

<Evaluation: Sensitivity>

The sensitivity was evaluated under the following conditions using the photosensitive members prepared in Examples 1 to 25 and Comparative Examples 1 to 4. The laser beam printer described above was used as an evaluation device, and modified so that an amount of exposure light (image exposure light) was set to 0.36 μJ/cm$^2$. Next, a process cartridge was modified, and a potential probe (model 6000B-8: manufactured by Trek Japan) was attached to a development position. In an environment with a temperature of 23° C. and a relative humidity of 50%, a potential at the center of the electrophotographic photosensitive member in the direction of the generating line was monitored with a surface electrometer (model 344: manufactured by Trek Japan). After a dark area potential was adjusted to −450 V, a bright area potential at the above light amount was measured.

If the bright area potential is high, it can be evaluated that the sensitivity is good, and if the bright area potential is low, it can be evaluated that the sensitivity is bad. It was judged that the effect of the present disclosure was obtained when the bright area potential was −100 V or more.

Table 1 shows the evaluation results of the abrasion resistance and the sensitivity.

TABLE 1

| | Polyrotaxane | | | | Charge transporting substance | | | Evaluation | |
| --- | --- | --- | --- | --- | --- | --- | --- | --- | --- |
| | Content ratio (mass %) | Name | Cyclic molecule | Straight-chain molecule | Content ratio (mass %) | Structure | Reactive monomer Structure | Amount of abrasion (μm) | Sensitivity (V) |
| Example 1 | 5.4% | AOPR20-1 | α-CD | PEG | 47.0% | CTM-1 | M-1 | 0.14 | −85 |
| Example 2 | 5.2% | AOPR20-1 | α-CD | PEG | 69.1% | CTM-1 | M-1 | 0.07 | −83 |
| Example 3 | 5.5% | AOPR20-1 | α-CD | PEG | 72.7% | CTM-1 | M-1 | 0.04 | −78 |
| Example 4 | 5.5% | MOPR20 | α-CD | PEG | 72.7% | CTM-7 | M-2 | 0.06 | −75 |
| Example 5 | 18.2% | MOPR20 | α-CD | PEG | 72.9% | CTM-7 | M-2 | 0.08 | −82 |
| Example 6 | 1.1% | AOPR20-1 | α-CD | PEG | 76.0% | CTM-1 | M-1 | 0.07 | −79 |
| Example 7 | 39.7% | AOPR20-1 | α-CD | PEG | 46.4% | CTM-1 | M-1 | 0.09 | −83 |
| Example 8 | 0.4% | AOPR20-1 | α-CD | PEG | 76.6% | CTM-1 | M-1 | 0.14 | −92 |
| Example 9 | 49.7% | AOPR20-1 | α-CD | PEG | 38.3% | CTM-1 | M-1 | 0.17 | −89 |
| Example 10 | 5.5% | AOPR05 | α-CD | PEG | 72.7% | CTM-1 | M-1 | 0.04 | −81 |
| Example 11 | 5.5% | AOPR35 | α-CD | PEG | 72.7% | CTM-1 | M-1 | 0.03 | −79 |
| Example 12 | 5.5% | AOPR20-2 | β-CD | PPG | 72.7% | CTM-1 | M-1 | 0.10 | −84 |
| Example 13 | 5.5% | AOPR20-3 | γ-CD | PPG | 72.7% | CTM-1 | M-1 | 0.13 | −87 |
| Example 14 | 5.5% | AOPR20-4 | β-CD | PBD | 72.7% | CTM-1 | M-1 | 0.11 | −88 |
| Example 15 | 5.5% | AOPR20-1 | α-CD | PEG | 93.5% | CTM-1 | — | 0.09 | −75 |
| Example 16 | 5.5% | AOPR20-1 | α-CD | PEG | 20.8% | CTM-1 | M-1 | 0.03 | −84 |
| Example 17 | 5.5% | AOPR20-1 | α-CD | PEG | 10.4% | CTM-1 | M-1 | 0.03 | −93 |
| Example 18 | 5.5% | AOPR20-1 | α-CD | PEG | 72.7% | CTM-3 | M-1 | 0.05 | −79 |
| Example 19 | 5.5% | AOPR20-1 | α-CD | PEG | 72.7% | CTM-4 | M-1 | 0.04 | −78 |
| Example 20 | 5.5% | AOPR20-1 | α-CD | PEG | 72.7% | CTM-15 | M-1 | 0.06 | −91 |
| Example 21 | 5.5% | AOPR20-1 | α-CD | PEG | 72.7% | CTM-16 | M-1 | 0.05 | −89 |
| Example 22 | 5.0% | HAPR20-g-PCL | α-CD | PEG | 66.1% | CTM-8 | M-3 | 0.08 | −80 |
| Example 23 | 5.0% | HAPR20-g-PCL | α-CD | PEG | 66.1% | CTM-10 | M-3 | 0.10 | −79 |
| Example 24 | 22.8% | HAPR20-g-PCL | α-CD | PEG | 59.6% | CTM-8 | M-4 | 0.14 | −82 |
| Example 25 | 22.8% | HAPR20-g-PCL | α-CD | PEG | 59.6% | CTM-10 | M-4 | 0.12 | −83 |
| Comparative Example 1 | 5.2% | HAPR20-g-PCL | α-CD | PEG | 45.5% | CTM-17 | M-3 | 0.32 | −105 |
| Comparative Example 2 | 5.0% | HAPR20-g-PCL | α-CD | PEG | 66.1% | CTM-17 | M-3 | 0.24 | −113 |
| Comparative Example 3 | 5.0% | HAPR20-g-PCL | α-CD | PEG | 0.0% | CTM-17 | M-3 | 0.23 | −173 |
| Comparative Example 4 | 22.8% | HAPR20-g-PCL | α-CD | PEG | 59.6% | CTM-17 | M-4 | 0.25 | −114 |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014150, filed Jan. 30, 2020 which is hereby incorporated by reference herein in its entirety.

What is claimed is:

1. An electrophotographic photosensitive member having a support, a photosensitive layer on the support, and a protection layer on the photosensitive layer, the protection layer being a surface layer of the electrophotographic photosensitive member, wherein
the protection layer comprising a polymerization product of a composition containing polyrotaxane and a charge transporting substance,
the polyrotaxane is a molecule in which a chain molecule passes through an inside of a ring of a cyclic molecule, the cyclic molecule includes the chain molecule, and blocking groups are arranged at both terminals of the chain molecule so as to prevent the cyclic molecule from being detached,
the cyclic molecule is α-cyclodextrin having a substituent selected from the group consisting of an acryloyloxy group and a methacryloyloxy group,
the charge transporting substance is a monomer having a polymerizable functional group selected from the group consisting of an acrylic group and a methacrylic group, the monomer having charge transport ability, and
the polymerization product includes a bond between the polyrotaxane and the charge transporting substance.

2. The electrophotographic photosensitive member according to claim 1, wherein the chain molecule of the polyrotaxane is polyethylene glycol.

3. The electrophotographic photosensitive member according to claim 1, wherein the charge transporting substance has a triarylamine skeleton.

4. A process cartridge that integrally supports an electrophotographic photosensitive member and at least one unit selected from the group consisting of a charging unit, a developing unit, and a cleaning unit and is detachably attachable to a main body of an electrophotographic image forming apparatus,
the electrophotographic photosensitive member having a support, a photosensitive layer on the support, and a protection layer on the photosensitive layer, the protection layer being a surface layer of the electrophotographic photosensitive member, wherein
the protection layer comprises a polymerization product of a composition containing polyrotaxane and a charge transporting substance,
the polyrotaxane is a molecule in which a chain molecule passes through an inside of a ring of a cyclic molecule, the cyclic molecule includes the chain molecule, and blocking groups are arranged at both terminals of the chain molecule so as to prevent the cyclic molecule from being detached, the cyclic molecule is α-cyclodextrin having a substituent selected from the group consisting of an acryloyloxy group and a methacryloyloxy group, the charge transporting substance is a monomer having a polymerizable functional group selected from the group consisting of an acrylic group and a methacrylic group, the monomer having charge transport ability, and the polymerization product includes a bond between the polyrotaxane and the charge transporting substance.

5. An electrophotographic image forming apparatus having an electrophotographic photosensitive member, a charging unit, an exposing unit, a developing unit, and a transfer unit, the electrophotographic photosensitive member having a support, a photosensitive layer on the support, and a protection layer on the photosensitive layer, the protection layer being a surface layer of the electrophotographic photosensitive member, wherein the protection layer comprises a polymerization product of a composition containing polyrotaxane and a charge transporting substance, the polyrotaxane is a molecule in which a chain molecule passes through an inside of a ring of a cyclic molecule, the cyclic molecule includes the chain molecule, and blocking groups are arranged at both terminals of the chain molecule so as to prevent the cyclic molecule from being detached, the cyclic molecule is α-cyclodextrin having a substituent selected from the group consisting of an acryloyloxy group and a methacryloyloxy group, the charge transporting substance is a monomer having a polymerizable functional group selected from the group consisting of an acrylic group and a methacrylic group, the monomer having charge transport ability, and the polymerization product includes a bond between the polyrotaxane and the charge transporting substance.

\* \* \* \* \*